(12) United States Patent
Macherel et al.

(10) Patent No.: US 10,696,335 B2
(45) Date of Patent: Jun. 30, 2020

(54) METHODS AND APPARATUS FOR PIVOTALLY MOUNTING TRAILER SKIRT

(71) Applicants: Philippe Macherel, Fribourg (CH); Calvin Rhett Bradley, Greenville, SC (US); David C. Lung, Simpsonville, SC (US); Larry Satterfield, Moore, SC (US)

(72) Inventors: Philippe Macherel, Fribourg (CH); Calvin Rhett Bradley, Greenville, SC (US); David C. Lung, Simpsonville, SC (US); Larry Satterfield, Moore, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 30 days.

(21) Appl. No.: 15/764,814

(22) PCT Filed: Sep. 30, 2016

(86) PCT No.: PCT/US2016/054951
§ 371 (c)(1),
(2) Date: Mar. 29, 2018

(87) PCT Pub. No.: WO2017/059332
PCT Pub. Date: Apr. 6, 2017

(65) Prior Publication Data
US 2018/0319442 A1 Nov. 8, 2018

Related U.S. Application Data

(60) Provisional application No. 62/235,209, filed on Sep. 30, 2015.

(30) Foreign Application Priority Data

Dec. 11, 2015 (WO) ................ PCT/US2015/065238

(51) Int. Cl.
*B62D 35/00* (2006.01)
*B62D 65/16* (2006.01)
(Continued)

(52) U.S. Cl.
CPC ......... *B62D 35/001* (2013.01); *B62D 29/043* (2013.01); *B62D 35/008* (2013.01); *B62D 35/02* (2013.01); *B62D 65/16* (2013.01)

(58) Field of Classification Search
CPC .. B62D 35/001; B62D 29/043; B62D 35/008; B62D 35/02; B62D 65/16
See application file for complete search history.

(56) References Cited

U.S. PATENT DOCUMENTS

| 4,291,911 A | 9/1981 | Gallmeyer |
| 4,611,847 A | 9/1986 | Sullivan |

(Continued)

FOREIGN PATENT DOCUMENTS

| JP | 2003011855 A | 1/2003 |
| JP | 2013237423 A | 11/2013 |

OTHER PUBLICATIONS

International Search Report and Written Opinion for PCT-US2015-065238 dated Jun. 16, 2016.

(Continued)

*Primary Examiner* — Lori L Lyjak
(74) *Attorney, Agent, or Firm* — Hahn Loeser & Parks LLP; Bret A. Hrivnak

(57) ABSTRACT

The present invention includes methods and apparatus for mounting a trailer skirt to a trailer. This includes attaching a trailer skirt to a trailer, the trailer skirt configured to pivot in a longitudinal direction of the trailer skirt. In certain embodiments, such methods are accomplished using a trailer-skirt coupling apparatus, the apparatus including a trailer mounting bracket configured for mechanically coupling the appa- (Continued)

ratus to a trailer and a skirt-supporting member operably attached to the trailer mounting bracket in a cantilevered configuration, where in the cantilevered configuration, the skirt-supporting member is configured to pivot in a longitudinal direction of the trailer skirt.

18 Claims, 6 Drawing Sheets

(51) Int. Cl.
    *B62D 29/04*     (2006.01)
    *B62D 35/02*     (2006.01)

(56) References Cited

U.S. PATENT DOCUMENTS

| | | |
|---|---|---|
| 4,749,538 A | 6/1988 | Anderson |
| 5,267,523 A | 12/1993 | Hugron |
| 5,277,146 A | 1/1994 | Hughes, Jr. |
| 7,093,889 B2 | 8/2006 | Graham |
| 7,347,019 B1 | 3/2008 | Shaw |
| 7,578,541 B2 | 8/2009 | Layfield et al. |
| 7,686,385 B2 | 3/2010 | Dolan et al. |
| 7,942,467 B2 | 5/2011 | Boivin et al. |
| 8,303,025 B2 | 11/2012 | Senatro |
| 8,678,474 B1 | 3/2014 | Boivin et al. |
| 8,727,425 B1 | 5/2014 | Senatro |
| 8,919,863 B2 | 12/2014 | Layfield et al. |
| 9,004,575 B2 | 4/2015 | Grandominico et al. |
| 9,272,741 B2 | 3/2016 | Gerst |
| 9,751,573 B2 | 9/2017 | Senatro |
| 2003/0057736 A1 | 3/2003 | Long et al. |
| 2009/0189414 A1 | 7/2009 | Boivin et al. |
| 2010/0264690 A1 | 10/2010 | Brown et al. |
| 2011/0253851 A1 | 10/2011 | Di Franco |
| 2011/0285167 A1 | 11/2011 | Butler |
| 2012/0074728 A1 | 3/2012 | Senatro |
| 2013/0270857 A1* | 10/2013 | Brown ................. B62D 25/168 296/180.4 |
| 2013/0285411 A1 | 10/2013 | Layfield et al. |
| 2014/0028050 A1 | 1/2014 | Rodriguez |
| 2014/0270940 A1 | 9/2014 | Butler et al. |
| 2014/0300134 A1 | 10/2014 | Gerst |
| 2014/0353443 A1 | 12/2014 | Kuo |
| 2015/0259014 A1 | 9/2015 | Baker et al. |
| 2017/0015369 A1* | 1/2017 | Senatro ................ B62D 35/001 |
| 2017/0029044 A1* | 2/2017 | Senatro ................ B62D 35/001 |
| 2018/0093719 A1* | 4/2018 | Emery .................. B62D 24/00 |
| 2018/0281875 A1 | 10/2018 | Macherel et al. |

OTHER PUBLICATIONS

International Search Report and Written Opinion for PCT-US2016-054951 dated Jan. 19, 2017.

ISR with WO for Application PCT US2015-065236 dated Jun. 10, 2016.

ISR with WO for Application PCT/US2016-054947 dated Jan. 19, 2017.

ISR with WO for Application PCT/US2016-054941 dated Jan. 19, 2017.

ISR with WO for Application PCT/US2015/065234 dated Jun. 9, 2016.

* cited by examiner

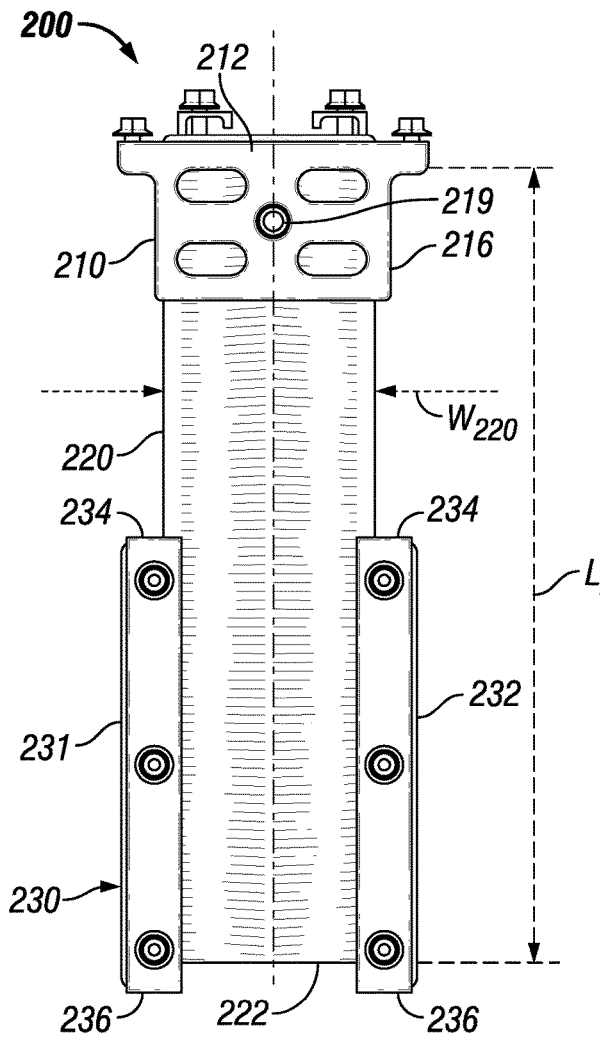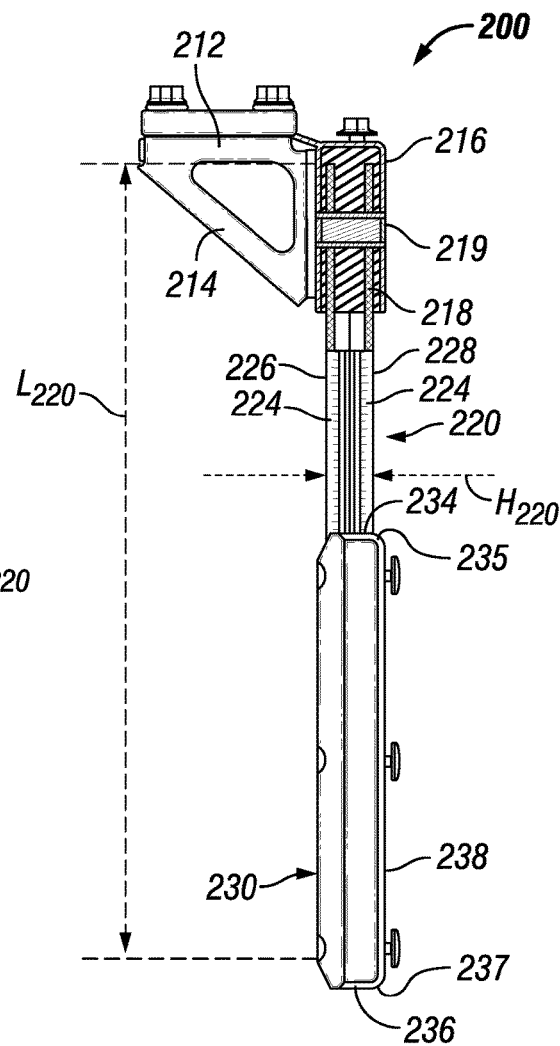
FIG. 3A
FIG. 3B
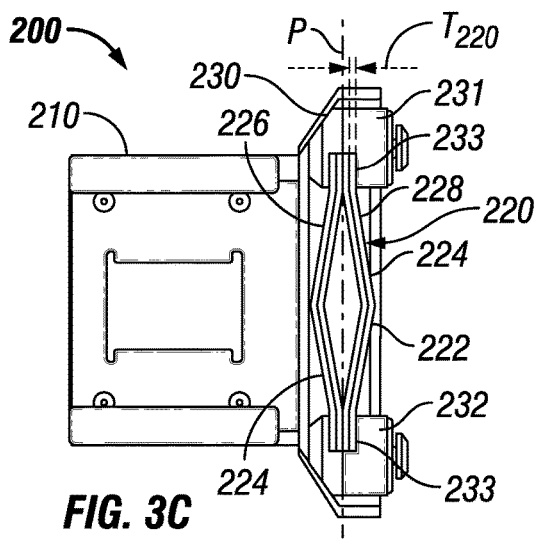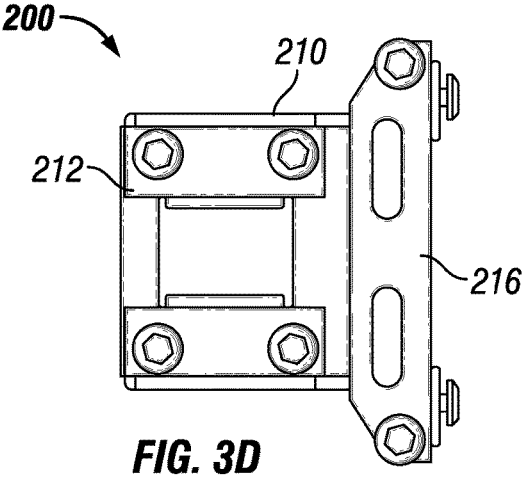
FIG. 3C
FIG. 3D

METHODS AND APPARATUS FOR PIVOTALLY MOUNTING TRAILER SKIRT

This application claims priority to International Patent Application No. PCT/US2015/065238 filed on Dec. 11, 2015, with the U.S. Patent Office (as the Receiving Office), which claims priority to, and the benefit of, U.S. provisional patent application No. 62/235,209, filed Sep. 30, 2015, with the U.S. Patent Office, both of which are hereby incorporated by reference.

FIELD OF THE INVENTION

This invention relates generally to towable trailers, and more specifically to aerodynamic improvements to skirts for towable trailers.

BACKGROUND OF THE INVENTION

Trailers towed by trucks and similar apparatuses for transporting cargo can be large, unwieldy, and include geometries which invite inefficiencies during travel. One aspect of these inefficiencies concerns the aerodynamics of the trailer.

In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced. The reduction in drag permits the trailer to be towed more efficiently, increasing the gas mileage and performance of the vehicle and its cargo. However, there are issues with the skirt being either too flexible and not holding its shape or being too rigid and non-resilient when encountering objects or ground-features that may impact the skirt, which may result in damage to the skirt and/or the trailer. Accordingly, there is a need to provide a skirt that is compliant and resilient.

SUMMARY OF THE INVENTION

Particular embodiments of the present invention include methods and apparatus for attaching trailer skirts to trailers.

As to the method, in certain embodiments, the method includes attaching a trailer skirt to a trailer, the trailer skirt configured to pivot in a longitudinal direction of the trailer skirt. As to the apparatus, in certain embodiments, the apparatus comprises a trailer-skirt coupling apparatus, the apparatus including a trailer mounting bracket configured for mechanically coupling the apparatus to a trailer and a skirt-supporting member operably attached to the trailer mounting bracket in a cantilevered configuration, where in the cantilevered configuration, the skirt-supporting member is configured to pivot in a longitudinal direction of the trailer skirt, where the skirt-supporting member is pivotably coupled to the trailer mounting bracket with a pin to provide a pivotable attachment.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

FIG. 3A is a front view of a trailer-skirt coupling apparatus for mounting a trailer skirt to a trailer, in accordance with an embodiment of the invention.

FIG. 3B is a side view of the trailer-skirt coupling apparatus shown in FIG. 3A.

FIG. 3C is a bottom view of the trailer-skirt coupling apparatus shown in FIG. 3A.

FIG. 3D is a top view of the trailer-skirt coupling apparatus shown in FIG. 3A.

DETAILED DESCRIPTION OF THE DRAWINGS

Figure 1:
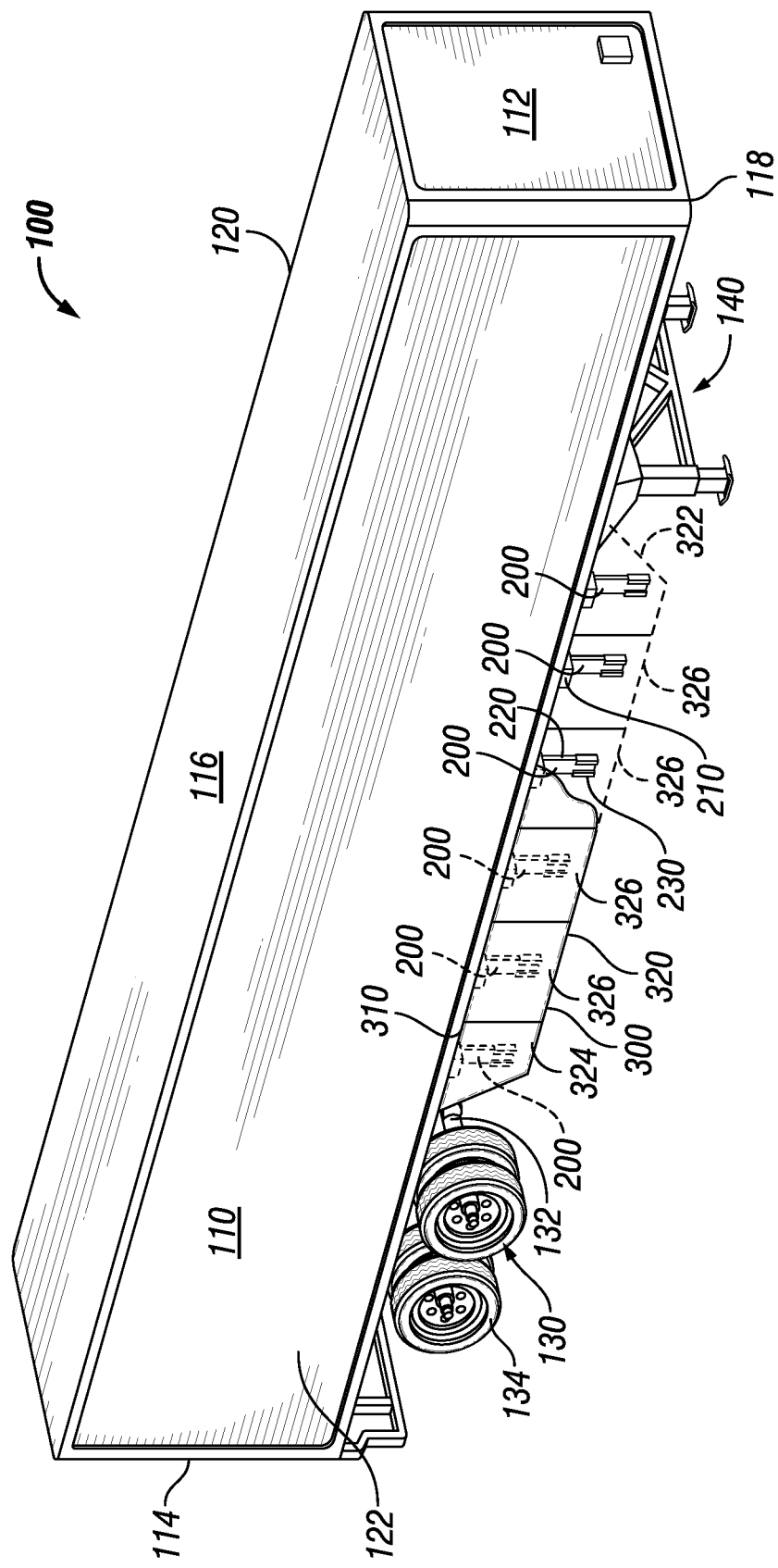
FIG. 1 is a perspective view of a trailer having a trailer skirt attached by the techniques disclosed herein, in accordance with an embodiment of the invention.

Trailer skirts are frequently constructed of inelastic materials, such as plastic, metal, or fiberglass. The trailer and vehicle towing the trailer maintain a level of ground clearance above the ground and debris or obstacles which might damage their construction. A trailer skirt, in contrast, it designed to consume much of this ground clearance to improve the aerodynamic performance of the trailer during operation, by altering the airflow to reduce turbulence and drag that otherwise negatively impact fuel consumption and other performance measures.

The motivation to position the trailer skirt near the road surface conflicts with the need for ground clearance and the avoidance of uneven portions of the ground and any obstacles or debris that may be arranged along the ground. If the trailer skirt does not remain sufficiently rigid, it will flex during vehicle operation as it is unable to resist the airflow arising due to vehicle motion. However, when an overly rigid trailer skirt encounters uneven ground or any other obstacle or debris, it is susceptible to damage when impacted if impact force overcomes the trailer skirt rigidity, to thereby create plastic deformation and damage to the trailer skirt. Thus, it is beneficial to employ techniques for mounting a trailer skirt to a trailer in a manner permitting trailer skirt impacts with little or no damage thereto, but which remains sufficiently rigid to avoid significant deflection as a result of airflow during vehicle operation.

Embodiments of the present invention provide methods for mounting a trailer skirt to a trailer, and trailer-skirt coupling apparatuses for achieving this purpose.

Particular embodiments of such methods for mounting trailer skirts to a trailer include attaching a skirt-supporting member to the trailer. The skirt-supporting member may comprise any structure extending between the trailer and the skirt, and which is operably attached to the skirt. For example, the skirt-supporting member may comprise a rigid or flexible member, may be elongate, and can be attached to the skirt using any desired mechanism, such as by use of one or more fasteners, weldments, adhesives, clamps, and/or mounting brackets, for example. It is appreciated that the step of attaching may include attaching the skirt-supporting member to a trailer in a cantilevered configuration.

In certain embodiments, as discussed further below, the skirt-supporting member comprises a bi-modulus bending member, and the step of attaching comprises attaching a bi-modulus bending member to a trailer in a cantilevered configuration. It is appreciated that in any cantilevered configuration, the bi-modulus bending member (or more generally the skirt-supporting member) may be fixedly attached at any point along its length, including at a terminal end thereof. It is also appreciated that the bending member may be attached in any desired manner, such as by use of one or more fasteners, weldments, adhesives, clamps, and/or mounting brackets, for example. In particular embodiments, attachment is achieved by attaching a trailer mounting bracket to a trailer, the bi-modulus bending member being operably attached to the trailer mounting bracket. The trailer mounting bracket may be attached to the trailer directly or indirectly, using any additional bracket, as well as any one or more fasteners, weldments, adhesives, or clamps.

Attachment of the bi-modulus bending member, or more generally attachment of any skirt-supporting member, to the trailer mounting bracket may also be achieved in any such manner. For example, any skirt-supporting member may be rigidly fixed within the trailer mounting bracket. By further example, in particular embodiments, the bi-modulus bending member, or more generally any skirt-supporting member, is attached to the trailer mounting bracket by arranging the bi-modulus bending member or skirt-supporting member into a resilient member formed of elastomeric material. Elastomeric material may comprise any desired material suitable for its intended purpose, and may include, for example, polyurethane, rubber (natural and/or synthetic), and silicone. In certain instances, the resilient member is molded around the bi-modulus bending member or the skirt-supporting member. In other instances, the resilient member may be simply placed into an orifice and retained therein by one or more other objects, such as pins or fasteners, or by adhesive or interference fit. For example, a pin is arranged to extend through both the resilient member and the skirt-supporting member or bi-modulus bending member. In doing so, in certain instances one or more pins are inserted in a central location of the resilient member, to allow the bending member to twist or pivot within the resilient member and about the pin (which acts as an axis of rotation), which allows the skirt-supporting member or bi-modulus bending member and the skirt to move by twisting about the pin and/or flexing as needed in a direction of the trailer or skirt length in certain embodiments, which is generally perpendicular to the bending direction of the bi-modulus bending member (that is, in a direction of a width of the bi-modulus bending member). By providing this resilient attachment between the skirt and trailer, any undesired impacts may be better absorbed to avoid plastic damage to the skirt, trailer, or the mechanism attaching the two structures. In alternative embodiments, the pin fixes the bi-modulus bending member or skirt-connection member translationally and rotationally.

In other instances the bi-modulus bending member, or more generally any skirt-supporting member, is simply placed into an orifice of the trailer mounting bracket and retained therein by one or more other objects, such as pins or fasteners, or by adhesive or interference fit. For example, a pin is arranged to extend through the bi-modulus bending member allowing the bi-modulus bending member to pivot in the direction of the length of the skirt about the pin (which acts as an axis of rotation), while not allowing it to pivot in the lateral direction. In doing so, in certain instances one or more pins are inserted in a central location of the bending member, to allow the bending member to twist or pivot, which allows that bi-modulus bending member and the skirt to move by twisting about the pin and/or flexing as needed in a direction of the trailer or skirt length, which in certain embodiments is generally perpendicular to the bending direction of the bi-modulus bending member (that is, in a direction of a width of the bi-modulus bending member). By providing this resilient attachment between the skirt and trailer, any undesired impacts may be better absorbed to avoid plastic damage to the skirt, trailer, or the mechanism attaching the two structures. In alternative embodiments, the pin fixes the bi-modulus bending member or skirt-connection member translationally and rotationally.

With regard to the bi-modulus bending member, it is appreciated that said member may be formed in any of a variety of manners. In particular embodiments, the bi-modulus bending member includes one or more elongate bending elements. Each elongate bending element has a length, width, height, and thickness. The length extends in a direction of the bi-modulus bending member length, while the width and height each extend in direction a perpendicular to each other and the length of the elongate bending element. The elongate bending element also has a cross-section extending in both the direction of elongate bending element width and height. With regard to the bi-modulus bending member, each elongate bending element is arranged such that its width extends in a direction of the bi-modulus bending member width and parallel to or coplanar with a central plane (bending plane) of the bi-modulus bending member. The height of each elongate bending element extends in a direction perpendicular to the width, and therefore perpendicular to the central plane of the bi-modulus bending member.

The bi-modulus bending member, as well as each elongate bending element, is designed to resist an applied force without noticeably bending or deforming, but when the applied force exceeds a designed threshold force, the bi-modulus bending member elastically bends into a bent arrangement, which may bifurcate the bi-modulus bending member, and elastically returns to its original or unbent arrangement. When bending, the bi-modulus bending member buckles (that is, the cross-section buckles), whereby the cross-section shape (profile) changes from a first cross-section shape to a second cross-section shape. By doing so, the bi-modulus bending member and each of the one or more elongate bending elements elastically buckle and bend to a buckled configuration when an applied force (such as its lateral force component) exceeds a threshold force and elastically returns to an unbuckled or unbent configuration when the applied force is reduced below the threshold force or removed. Stated differently, the bi-modulus bending member, and each elongate bending element, can be characterized as being a bi-modulus (or bi-stable) member, where each member or element resists bending with a first bending modulus until it buckles or collapses and thereafter bending ensues without any notable plastic deformation or resistance, where the buckled cross-section has a second bending modulus.

In particular embodiments, the bi-modulus characteristic is accomplished by the elongate bending element being a thin-walled member, having a sufficiently thin thickness, such as a thickness of 1.0 millimeters (mm) or less, or 0.5 mm or less, for example. In further embodiments, each elongate bending element has a thickness in the range of 0.25 mm to 0.75 mm. For those thicknesses identified in the previous two sentences, each elongate bending element is made from a sheet of stainless steel spring steel, and in other variations, made from any other material that would allow the elongate bending element, alone or together with any other elongate bending elements, which may or may not be the same, to operate as a bi-modulus bending member. It is appreciated that when using any material other than stainless spring steel, such as any other spring steel or any other metal or polymeric material, for example, whether any such material is inelastic or elastic, the thickness of the elongate bending element has a thickness that may or may not be different from those thickness specifically identified above such as may be required to allow the elongate bending member, alone or together with any other elongate bending members, to operate as a bi-modulus bending member. Again, by forming the elongate bending elements of sufficiently thin thicknesses, plastic deformation is significantly or fully eliminated, and thereby operating alone or in cooperation with other elongate bending elements with a bi-modulus characteristic, or stated differently, as a bi-modulus bending member. It is appreciated that the thickness of any elongate bending element may remain constant or may vary in any lengthwise and/or widthwise direction of the elongate bending element. The selection of a thickness may be made in cooperation with the cross-sectional shape taken in a plane perpendicular to the lengthwise direction of the elongate bending element to arrive at the specific bi-modulus performance requirements desired for a specific use or installation. Additionally, or in the alternative, in certain embodiments, the bi-modulus characteristic for an elongate bending element is accomplished by the height of the cross-section being less than the width. By increasing the height, the bending stiffness increases, while decreasing the height, the bending stiffness decreases. While the height may be equal to any desired distance, in certain embodiments, such as when the elongate bending element has a V, U, or W-shaped cross-section, for example, the height is 6 to 15 mm. Any cross-section have a height may also increase its bending stiffness by increasing the width of the portion of the elongate bending element having a height. While the portion of the elongate bending element cross-section having a height may be equal to any width, in certain embodiments, such as when the elongate bending element has a V, U, or W-shaped cross-section, for example, the width of this portion is 40 mm to 100 mm. To also increase bending stiffness, a plurality of elongate bending elements may be arranged in a stacked arrangement. It is also noted that when employing a plurality of stacked elongate bending elements, the stacked elongate bending members are able to slide relative each other, which also facilitates the bi-modulus behavior. Moreover, the bi-modulus characteristic may be further accomplished by the unbent or unbuckled cross-section being asymmetrical, the cross-section being asymmetric relative to a centerline extending in a direction of the element's width. The centerline forms a neutral bending axis or a line that divides the cross-sectional area into equal halves. It is appreciated that any cross-section of the elongate bending element may be constant or variable in size and/or shape along the length of each elongate bending element.

In certain embodiments, each elongate bending element is arranged such that its width extends in a direction of the bi-modulus bending member width and parallel to or coplanar with a central plane of the bi-modulus bending member along a non-linear path. For example, in certain instances, the cross-section extends along a non-linear path comprising an arcuate path in the direction of the elongate bending element width. In extending along an arcuate path, the cross-section is U-shaped. In other variations, cross-section extends along a non-linear path forming a linearly alternating path, such as where the cross-section is V-shaped or W-shaped, for example. It is appreciated that each elongate bending element having a U or V-shaped cross-section (two of which may form a W-shaped cross-section) may be arranged in one of two arrangements, each of which being where a central peak of the U (rounded or planar peak) or of the V (sharp peak or vertex) is arranged furthest or closest to the central plane. It is also appreciated that the central peak may be flat or otherwise arranged along a central portion extending between the legs of the V-shape or W-shape cross-section. In certain exemplary embodiments, the central portion measures up to 50 mm. It is also noted that the legs of any U, V, or W-shaped cross-section of the elongate bending element are arranged to extend in a direction biased to the direction of the cross-section height, there the direction can be described as having vector components extending in each of the direction of the cross-section height and width. In certain instances, for example, each leg extends at an angle of 70 to 80 degrees relative the direction of the cross-section height or the legs extend in particular directions such that an angle of 140 to 160 degrees is formed between the legs. In any instance, "the direction of the cross-section height" can also be described as a plane extending purely in both a direction of the cross-section height (perpendicular to the cross-section width) and a direction of the elongate bending element length.

It is appreciated that the bending stiffness of the bi-modulus bending member may be selected or adjusted by altering any elongate bending element employed and/or by employing more or less elongate bending elements. For example, in certain instances, the one or more elongate bending elements comprise a plurality of elongate bending elements arranged into a first subset and a second subset. Each of the first subset and the second subset include one or more elongate bending elements of the plurality of bending elements. The first subset is arranged opposite the second subset relative a central plane extending in a direction of the bi-modulus bending member length and width, the central plane being a neutral bending axis for the bi-modulus bending member. By virtue of employing the first and second sets of elongate bending elements, bending stiffness can be controlled in both the bending direction and the opposite direction in which the bi-modulus bending member returns to the unbent arrangement.

It is appreciated that each of the first and second subsets may include the same quantity or different quantities of elongate bending elements, and of the same or different form or arrangement, to control the stiffness and performance of the bi-modulus bending member. For example, in certain instances, at least one of the first subset and the second subset includes two or more elongate bending elements of the plurality of bending elongate elements. The two or more elongate bending elements are arranged in a stacked arrangement, that is, side-by-side in a direction of each bending element thickness. A stacked arrangement connotes that elongate bending elements are engaged against one another in a nested or semi-nested arrangement. It is appreciated that in the stacked arrangement, the plurality of bending elements have substantially the same cross-section, while in other embodiments, elements of different cross-section are employed.

In particular embodiments, such methods include operably attaching a trailer skirt to the bi-modulus bending member, or, more generally to the skirt-supporting member. As provided above, attachment can be completed directly using hardware, adhesives, welding, or other known methods for attaching like objects. Such attachments may form a fixed attachment, where the attachment constrains each skirt-supporting member, relative to each other, in all directions. A fixed attachment can be accomplished by any known manner, such as by use of fasteners, weldments, adhesives, etc. Alternatively, attachment can be completed where the trailer skirt slides along, or relative to, a skirt-supporting member, such as the bi-modulus bending member, by operably coupling a trailer skirt to a skirt-supporting member, such as the bi-modulus bending member, to provide a sliding coupling between the trailer skirt and the skirt-supporting member or bi-modulus bending member. By doing so, the trailer skirt may slide along a skirt-supporting member as it bends, which in turn allows a portion of the skirt fixedly attached to the trailer (directly or indirectly) to remain close to the trailer, such as when a top portion of the skirt is attached to the trailer. Otherwise, the portion of the skirt fixedly attached to the trailer may have a greater tendency to pull away from the trailer with increased separation, which stresses various connections and members associated with the assembly. In particular embodiments, the sliding coupling includes slidably (also referred to as slidingly herein) arranging a skirt-supporting member, such as the bi-modulus bending member, in a skirt channel. In doing so, one or more skirt channels are used to slidably attach the skirt-supporting member/bi-modulus bending member to the trailer skirt. Particularly, the one or more skirt channels are configured to receive and partially constrain a skirt-supporting member (such as the bi-modulus bending member) while also permitting the skirt-supporting member (bi-modulus bending member) to slide through and relative the one or more skirt channels. In summary, a channel is formed through which the elongate member slides. The channel may be formed by apertures formed within the one or more skirt channels, or between the one or more skirt channels and the skirt. The one or more skirt channels may be attached to the skirt in any manner, such as using any one or more fasteners, weldments, or adhesives. When one skirt channel is employed, a single member is configured to receive and partially constrain a skirt-supporting member while also permitting the skirt-supporting member to slide there through. This single member may extend partially or fully across a width of the skirt-supporting member. For example, the single member may form a strap, cable, or the like, which may not be necessarily shaped to the skirt-supporting member, or a member shaped to particularly receive a particularly shaped skirt-supporting member, and which may be shaped by molding, extrusion, machining, or any other known shaping process. When using multiple skirt channels, in one exemplary embodiment, a pair of skirt channels are employed, with each of the pair arranged on one side of the skirt-supporting member width. Optionally, such methods may include operably fixing a portion of the trailer skirt to the trailer, such as a top portion, for example. This fixing may be accomplished by any desired manner. In particular instances, operably fixing comprises attaching the portion of the trailer skirt to the trailer or to the trailer mounting member. In more particular instances, operably fixing comprises attaching the top portion of the trailer skirt to the trailer by way of the trailer mounting member. Alternatively, the one or more skirt channels may be formed as a portion of the trailer skirt, such as where one or more skirt channels are integrally formed with or monolithically formed in the trailer skirt.

In particular embodiments, the method can further include coupling two or more skirt panels with the bi-modulus bending member and one or more additional bending members. In such embodiments, the method can also include attaching one or more stiffening members to at least two of the two or more skirt panels.

The methods generally described above, and the manner in which they are employed or practiced, are now discussed in further detail below with reference to various exemplary embodiments of the trailer-skirt coupling device.

Figure 2:
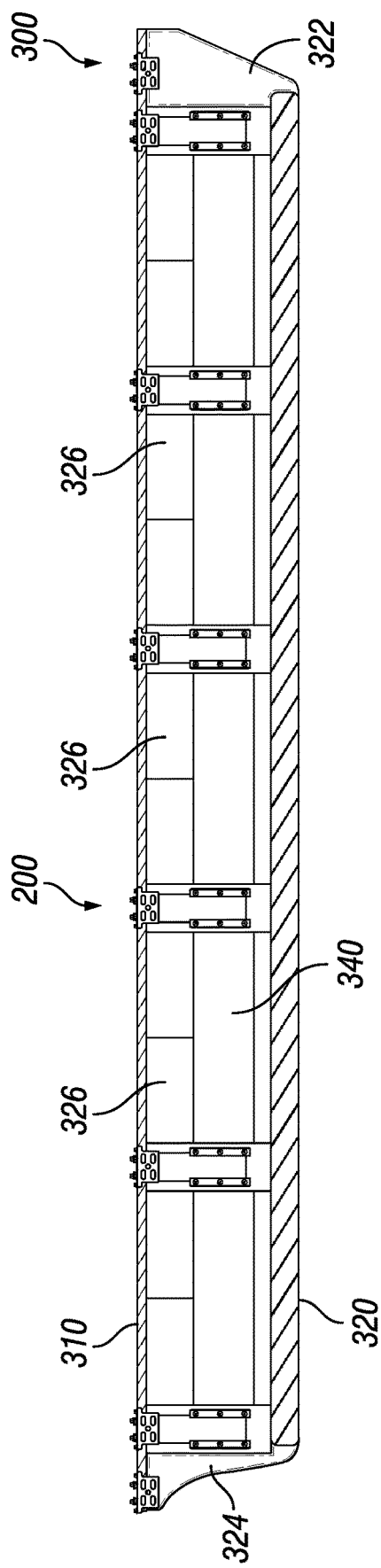
FIG. 2 is an interior side view of the trailer skirt shown in FIG. 1, in accordance with an exemplary embodiment of the invention.

FIG. 1 is a view of a trailer system 100 having a trailer skirt 300 attached by a plurality of trailer-skirt coupling apparatuses 200, while FIG. 2 shows an interior side of the trailer skirt 300 in conjunction with a plurality of the trailer-skirt coupling apparatuses. Trailer system 100 includes trailer 110 having a front 112, rear 114, top 116, bottom 118, and sides 120 and 122. Wheel assembly 130 having tires 134 are mounted on axle 132 toward rear 114 of trailer 110. Opposite, toward front 112, landing gear 140 is used to stand trailer system 100 when not attached to a vehicle. Between landing gear 140 (and/or the axles and wheels of a vehicle by which trailer 110 can be towed) and wheel assembly 130, there is an open-air gap beneath trailer bottom 118. To prevent unwanted air flow through this area during trailer towing operation, trailer skirt 300 is provided to fluidly isolate at least a portion of the space between landing gear 140 and wheel assembly 130.

In the embodiment shown, each trailer-skirt coupling apparatus 200 is arranged under an outer edge of trailer 110 such that a skirt-supporting member comprising a bi-modulus bending member 220 is arranged beneath the outer edge of trailer 110, keeping any attached skirt or skirt panel flush with or withdrawn under the outer edge of trailer 110 at least when bi-modulus bending member 220 is arranged in an unbent or unbuckled configuration.

Also in the embodiment shown, trailer skirt 300 is comprised of front trailer skirt panel 322, rear trailer skirt panel 324, and one or more central skirt panels 326. It is appreciated that, in lieu of the trailer skirt shown, any known trailer skirt may be employed with any variation of the methods and trailer-skirt coupling apparatus contemplated herein. For example, while the front trailer skirt panel 322, rear trailer skirt panel 324, and the one or more central skirt panels 326 are shown to be of different shapes/constructions, it is contemplated that each can be the same in other variations. Each of front trailer skirt panel 322, rear trailer skirt panel 324, and the one or more central skirt panels 326 are coupled to a plurality of trailer-skirt coupling apparatuses 200, which in turn are coupled to the trailer to thereby couple each panel of trailer skirt 300 to trailer 110.

With reference to FIGS. 3A to 3D, an exemplary embodiment of a trailer-skirt coupling apparatus 200 is shown in greater detail. Trailer-skirt coupling apparatus 200 includes a trailer mounting bracket 210, bi-modulus bending member 220, and skirt channel 230. Trailer mounting bracket 210 is configured for mechanically coupling the apparatus to a trailer. Bi-modulus bending member 220 is also shown operably attached to the trailer mounting bracket 210 in a cantilevered configuration. Skirt channel 230 is configured to, and shown to, slidingly couple the bi-modulus bending member 220 to the trailer skirt 300.

FIGS. 3A and 3B provide lengthwise views of the trailer-skirt coupling apparatus 200. Trailer mounting bracket 210 is shown to have a first portion 212 configured for attachment to a trailer, such as a trailer bottom side rail or other portion of the trailer. The first portion is also shown in FIG. 3D from a top view. In the embodiment shown, the trailer mounting bracket is configured to use fasteners for attaching the trailer mounting bracket to the trailer. Side members 214 extend between the first portion 212 and a second portion 216 for the purpose of providing additional strength and structural integrity to the trailer mounting bracket 210. Second portion 216 is configured to attach to (or receive and retain) bi-modulus bending member 220. In the embodiment shown, bi-modulus bending member 220 is retained within a resilient member 218, which is made of an elastomeric material that permits the bi-modulus member to twist while remaining fixed in certain directions within the trailer mounting bracket 210 by a pin 219 extending through the second portion 216, the resilient member and the bi-modulus bending member. It is appreciated that in certain variations, the pin does not extend through the bi-modulus bending member or is not used at all in lieu of other retention mechanism(s). Bi-modulus bending member 220 is shown to have a length $L_{220}$, extending from within the trailer mounting bracket 210 and to a terminal end 222 arranged within skirt channel 230. It is appreciated that the skirt channel may be arranged along any portion of bi-modulus bending member length, such that terminal end may be maintained within or outside the skirt channel. With specific reference to FIG. 3A, a width $W_{220}$ of bi-modulus bending member 220 is shown, while in FIG. 3B, a height $H_{220}$ of the bi-modulus bending member is shown.

With reference to FIG. 3C, bi-modulus bending member 220 is shown to comprise a plurality of elongate bending elements 224 separated into a first subset 226 and a second subset 228, where a central plane P of bi-modulus bending member 220 is located between the subsets. Central plane P can be referred to as the neutral bending plane (containing a neutral bending axis of the cross-section) of the bi-modulus bending member 220. Each of the plurality of elongate bending elements are shown to have a cross-section in an unbuckled configuration. Each cross-section can be said to be asymmetric in the unbuckled configuration relative to a centerline of the cross-section extending in a direction of the elongate bending element width and passing by the center of gravity of the cross-section. Each of the plurality of bending elements has substantially the same cross-section in the unbuckled configuration. For each of the one or more elongate bending elements, the cross-section can also be described as extending along a non-linear path in a direction of the element width, in the unbuckled configuration. Specifically, each of the elongate bending elements 224 are shown to have V-shaped cross-sections. In the arrangement shown, the open side of the V-shaped cross-section for each elongate bending element 224 of the first subset 226 faces or is directed towards the open side of the V-shaped cross-section for each elongate bending element 224 of the second subset 228, and vice versa. In other embodiments, the V-shaped cross-sections can be oppositely arranged relative to each other, where the open side for each elongate bending element in one subset faces away from the open side for each elongate bending element in the other subset. As noted above, other cross-section variations are contemplated, including U-shaped cross-sections. It is appreciated that the bi-modulus bending member may include one or any plurality of elongate bending elements which may be relegated to a single subset or divided into multiple subsets.

Figure 4A:
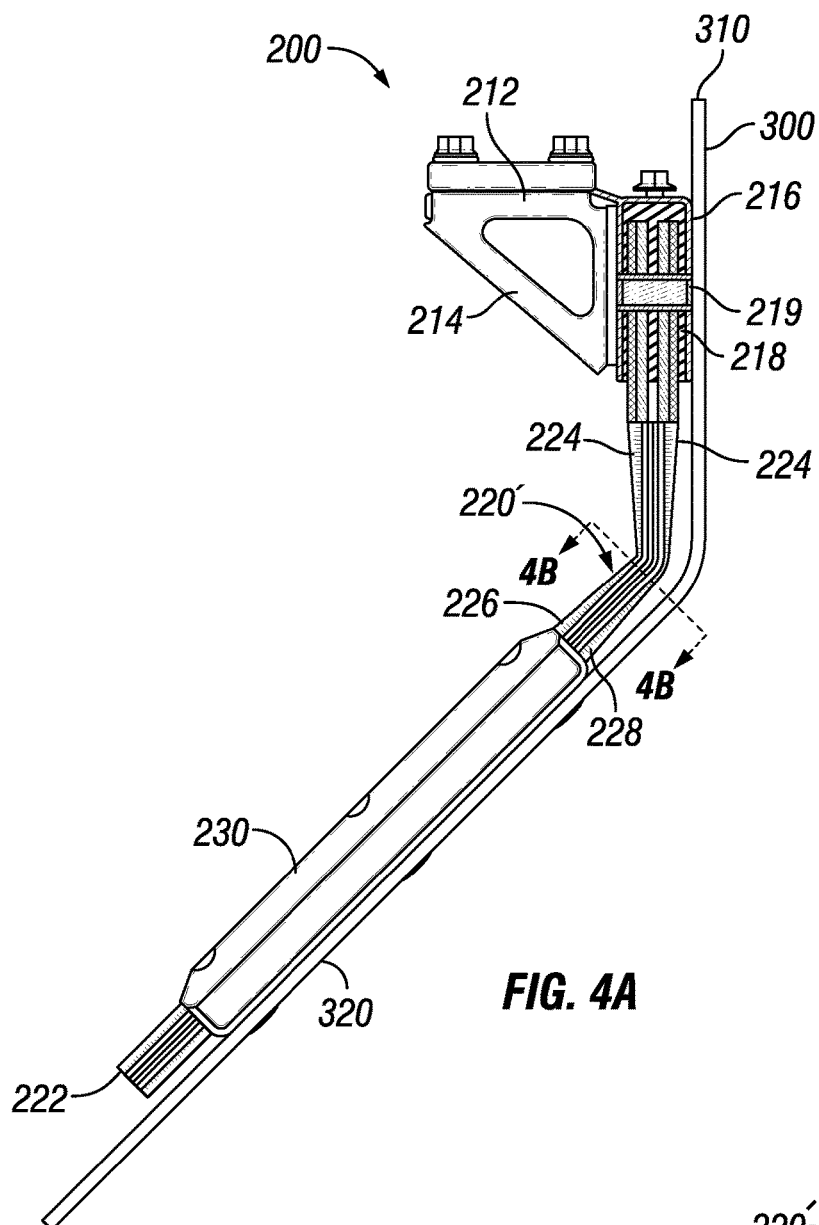
FIG. 4A is a side view of the trailer-skirt coupling apparatus shown in FIG. 3B attached to a trailer skirt, each of which are shown in a bent and buckled configuration, in accordance with an embodiment of the invention.
Figure 4B:
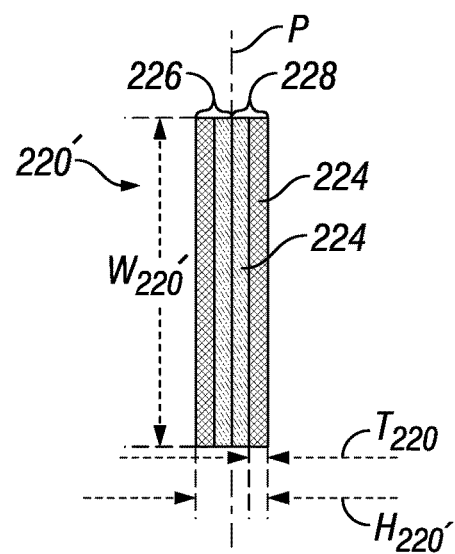
FIG. 4B is a sectional view taken from FIG. 4A along line 4B-4B, showing the bi-modulus bending member with each elongate bending element in a buckled configuration, in accordance with an embodiment of the invention.

It is appreciated that the plurality of elongate bending elements are each a thin-walled member, where the corresponding thickness of each is small relative the length, height, and width of each such element. With reference to FIGS. 3C and 4B, elongate bending element thickness $T_{220}$ is shown. In each of the embodiments shown, each of the plurality of elongate bending elements are formed of stainless steel spring steel having any thickness contemplated herein, but as stated previously, any other material or materials may be employed to achieve an elongate bending element that alone or together with one or more additional elongate bending members operates as a bi-modulus bending member. Thickness $T_{220}$ is shown to remain constant, but may vary as otherwise contemplated herein. In addition to the exemplary alternatives provided herein, each such element may be formed of multiple thin layers of material to discourage plastic deformation. In such exemplary alternatives, a single element can have multiple layers, or multiple elements in a set can comprise single thin layers.

In FIGS. 3A and 3B, bi-modulus bending member 220 is shown to extend downward from trailer mounting bracket 210 in an unbent and unbuckled configuration. In this configuration, bi-modulus bending member is substantially straight and rigid as it resists applied forces (such as lateral or side forces) below a threshold force (buckling threshold) that otherwise would bend and buckle the bi-modulus bending member at a location along its length. Such applied forces at least result from airflow during vehicle operation. In this configuration, the bi-modulus bending member is characterized as having a first bending modulus. After force components exceeding the threshold force are transmitted to the bi-modulus bending member, the bi-modulus bending member buckles elastically (that is, without or with negligible plastic deformation) as it transitions to a flexible state having a reduced bending modulus as the cross-section of the bi-modulus bending member changes locally at the buckling location. This is best seen in FIGS. 4A and 4B, where the bi-modulus bending member 220 is shown in a bent and buckled configuration. In this configuration, it is apparent that the cross-section of the bi-modulus bending member collapses to narrowed height and to a reduced bending modulus. Upon removal of the threshold force, bi-modulus bending member returns to an unbuckled configuration, substantially returning itself (and any attached skirt or skirt panel) to its rigid position without or with negligible plastic deformation. While aspects herein refer to lateral forces, buckling can also occur due to a longitudinal force transmitted substantially aligned with the length of the bi-modulus bending member.

With further reference to FIG. 4A, trailer-skirt coupling apparatus 200, bi-modulus bending member 220', and the trailer skirt 300 are shown in a bent and buckled configuration. In particular, with additional reference to FIG. 4B, first subset 226 and second subset 228 of the plurality of elongate bending elements 224 collapse and narrow in cross-sectional height to $H_{220'}$ and simultaneously slightly extend in cross-sectional width to $W_{220'}$ in the buckled configuration. This reduces the bending modulus and resistance to bending, in turn permitting bi-modulus bending member 220' and skirt 300 to swing inward or outward as required with less resistance. With reference to FIG. 4B, the narrowed height $H_{220'}$ of bi-modulus bending member 220' and each elongate bending element 224 is evident.

It is appreciated that the bi-modulus bending member can retain substantially similar qualities over a desired range of temperatures and operating conditions, including without limitation corrosion, ultraviolet light, chemical exposure, and other environmental and roadway hazards. It is also appreciated that the bi-modulus bending member may be configured only to buckle inward (that is, in a direction below a trailer) and not outward (that is, in a direction away from the trailer) and in both inward and outward directions. It is also appreciated that different bending resistance may be provided by the bi-modulus bending member in the inward and outward directions.

With reference to FIGS. 1 and 2, bi-modulus bending member 220 is shown slidingly coupled to a trailer skirt 300 permitting relative motion between the bi-modulus bending member and the trailer skirt as the bi-modulus bending member bends between unbuckled and buckled configurations. In particular embodiments, this sliding attachment is achieved using skirt channel 230, although appropriate alternatives can be substituted to achieve the stated purpose of providing a sliding attachment of the bi-modulus bending member to the skirt. Skirt channel 230 can comprise one or more discrete elements and is configured to be fixedly attached to a skirt. In the embodiment depicted more specifically in FIGS. 3A-3C, skirt channel 230 is formed using two elements, namely, first skirt channel guide 231 and second skirt channel guide 232. First skirt channel guide 231 and second skirt channel guide 232 are fixedly arranged to at least a portion of a trailer skirt (e.g., a panel of a trailer skirt, a part of a monolithic trailer skirt) for accepting bi-modulus bending member 220. First skirt channel guide 231 and second skirt channel guide 232 can be attached to a trailer skirt using fasteners, weldments, adhesives, and/or any other desired means. In the embodiment shown, first skirt channel guide 231 and second skirt channel guide 232 include a groove 233 within which the bi-modulus bending member 220 translates as it slides relative to the skirt during bending. As an alternative, one or more grooves can be formed between the skirt and skirt channel to receive the bi-modulus bending member and form a sliding attachment thereof to the skirt. As another alternative, one or more skirt channels may be formed within the trailer skirt. As best seen in FIG. 3B, to reduce any points of stress between the trailer skirt and the skirt channel 230, in particular embodiments, each of a top edge 235 arranged between a top side 234 and the back face 238 of the skirt channel and a bottom edge 237 arranged between a top side 236 and the back face 238 of the skirt channel are rounded or chamfered to reduce any contact stresses between the skirt channel and the skirt when any skirt-supporting member bends.

While the illustrated embodiments show trailer skirt 300 arranged underneath an outer edge of a trailer, trailer skirt 300 may be arranged to ensure its displacement during buckling of bi-modulus bending member 220 is contained beneath the trailer. In this regard, trailer mounting bracket 210 can be arranged beneath the trailer such that trailer skirt 300 is inset beneath the bottom of the trailer. Alternatively, trailer mounting bracket 210 and/or bi-modulus bending member 220 can be angled inward to arrange trailer skirt 300 at a non-normal angle to the bottom of a trailer.

By allowing the bi-modulus bending member 220 to slide relative to the skirt 300, a top portion 310 of the trailer skirt can be attached to a trailer as to hold the forces attempting to pull the top of the trailer skirt away from the trailer as the bi-modulus bending member bends. Otherwise, if not attaching the top of the skirt to the trailer, the top of the skirt would flare out from the side of the trailer as the bi-modulus bending member bends, whereby the trailer skirt could impact any obstacles located outwardly from the sides of the trailer. Thus, when bi-modulus bending member 220 bends inwardly, such as is shown by example in FIG. 4A, the trailer skirt top 310 remains fixed relative to the trailer 110 while a bottom portion 320 of the skirt bends inwards with the bi-modulus bending member 220 with relative translation between the bi-modulus bending member and the skirt channel 230. In an alternative embodiment, a top portion 310 of the trailer skirt can be placed in one or more grooves along the side of the trailer 110 and thereby permit the top portion of the skirt to slide up and down within the one or more grooves as the bi-modulus bending member bends. Other alternatives may be employed to achieve this stated purpose.

It is appreciated that while trailer skirt 300 is generally shown in a configuration whereby trailer-skirt coupling apparatus is located inward (behind) the trailer skirt relative to an outer side of the trailer along which the skirt is mounted, alternative embodiments permit the trailer-skirt coupling apparatus to be arranged outside (in front of) the trailer skirt relative to outer side of the trailer along which the skirt is mounted. It is also appreciated that the trailer skirt can include stiffening members to maintain the structural integrity of the skirt during operation. For example, with reference to the exemplary embodiment in FIG. 2, trailer skirt 300 includes stiffening members 340 arranged between two or more of front skirt panel 322, rear skirt panel 324, and central skirt panels 326. Stiffening members 340 can create a rigid or semi-rigid continuity between different panels to prevent relative movement there between or a flow of air between adjacent panels.

Figure 5:
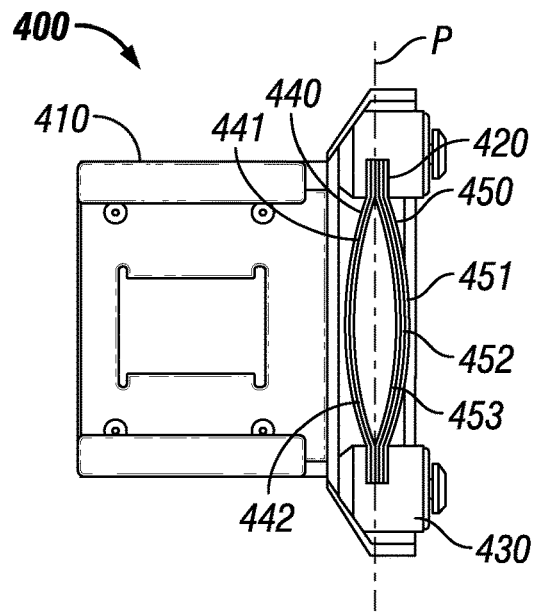
FIG. 5 is a bottom view of a trailer-skirt coupling apparatus having a bi-modulus bending member including an asymmetrical arrangement of elongate bending elements, in accordance with another exemplary embodiment of the invention.

FIG. 5 illustrates an alternative embodiment of a trailer-skirt coupling apparatus 400 including a trailer mounting bracket 410, bi-modulus bending member 420, and skirt channel 430 used to couple a trailer skirt to the bi-modulus bending member 420. As shown in FIG. 5, bi-modulus bending member 420 includes a first subset 440 and a second subset 450. First subset 440 as illustrated includes two elongate bending elements 441 and 442, while second subset 450 includes three bending elements 451, 452, and 453. Each of the elongate bending elements are shown to have an arcuate, or more specifically, a U-shaped cross-section. In this regard and as set forth herein, various combinations of one or more bending elements within a single respective subset or multiple subsets of a bi-modulus bending member can be utilized to effect the desired bending properties of the bi-modulus bending member and the first and second bending modulus of the bi-modulus bending member under various force thresholds.

Figure 6A:
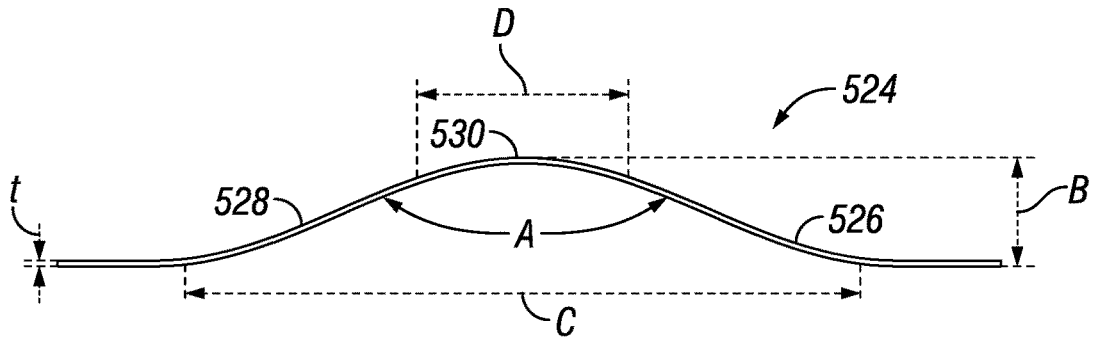
FIG. 6A is a sectional view of an elongate bending element for use in forming a bi-modulus bending member in accordance with another embodiment of the invention.
Figure 6B:
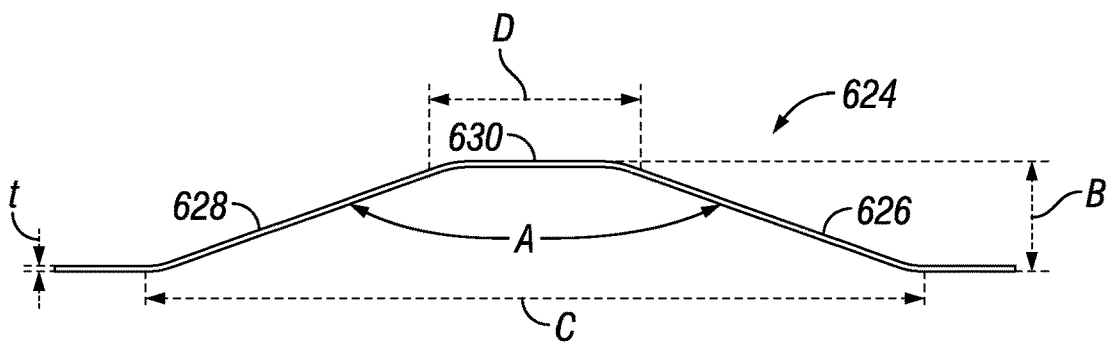
FIG. 6B is a sectional view of an elongate bending element for use in forming a bi-modulus bending member in accordance with another embodiment of the invention.

As previously noted, each elongate bending element may be characterized as having any desired cross-sectional shape having a height to provide a desired bending modulus for forming a bi-modulus bending member. For example, in the bi-modulus bending members 220, 420 shown in FIGS. 3C and 5, respectively, V-shaped and U-shaped elongate bending elements 224, 441, 442, 451-453 are employed, respectively. By further example, with reference to FIG. 6A, another elongate bending element 524 having a non-linear cross-section is shown forming a U-shaped cross-section having smooth transitions at the ends of the "U". By yet further example, with reference to FIG. 6B, another elongate bending element 624 having a non-linear cross-section is shown forming a flat or plateaued cross-section, which generally forms a U-shaped cross-section or a V-shaped cross-section with a flattened central peak. Elongate bending element 624 has a thickness t and a height B, While the elongate bending element 624 may have any desired thickness as contemplated herein, in certain embodiments the element has a thickness t of 1.0 millimeters (mm) or less, or 0.5 mm or less, for example, or in more specific instances, a thickness t in the range of 0.25 mm to 0.75 mm. Likewise, while height B may be equal to any desired distance contemplated herein, in certain embodiments, the height B is 6 to 15 mm. Any cross-section having a height B may also increase its bending stiffness by increasing the width C of the portion of the elongate bending element extending outwardly by a height. While this portion of the elongate bending element cross-section may be equal to any width C, in certain embodiments, the width C of this portion is 40 mm to 100 mm. It is also appreciated that the central peak may be flat or curvilinear, extending widthwise by a width D between the legs of the V-shape or W-shape cross-section. In certain exemplary embodiments, the width D of central portion 530, 630 measures up to 50 mm (0 to 50 mm). It is also noted that the legs of any U, V, or W-shaped cross-section of the elongate bending element are arranged to extend in a direction biased to the direction of the cross-section height B, there the direction can be described as having vector components extending in each of the direction of the cross-section height B and width C. In certain instances, for example, each leg 526, 528, 626, 628 extends at an angle A measuring 140 to 160 degrees is formed between the legs 526, 528, 626, 628, although other angles may be employed as desired to achieve a desired bending stiffness. In any instance, "the direction of the cross-section height" can also be described as a plane extending purely in both a direction of the cross-section height (perpendicular to the cross-section width) and a direction of the elongate bending element length.

Figure 7:
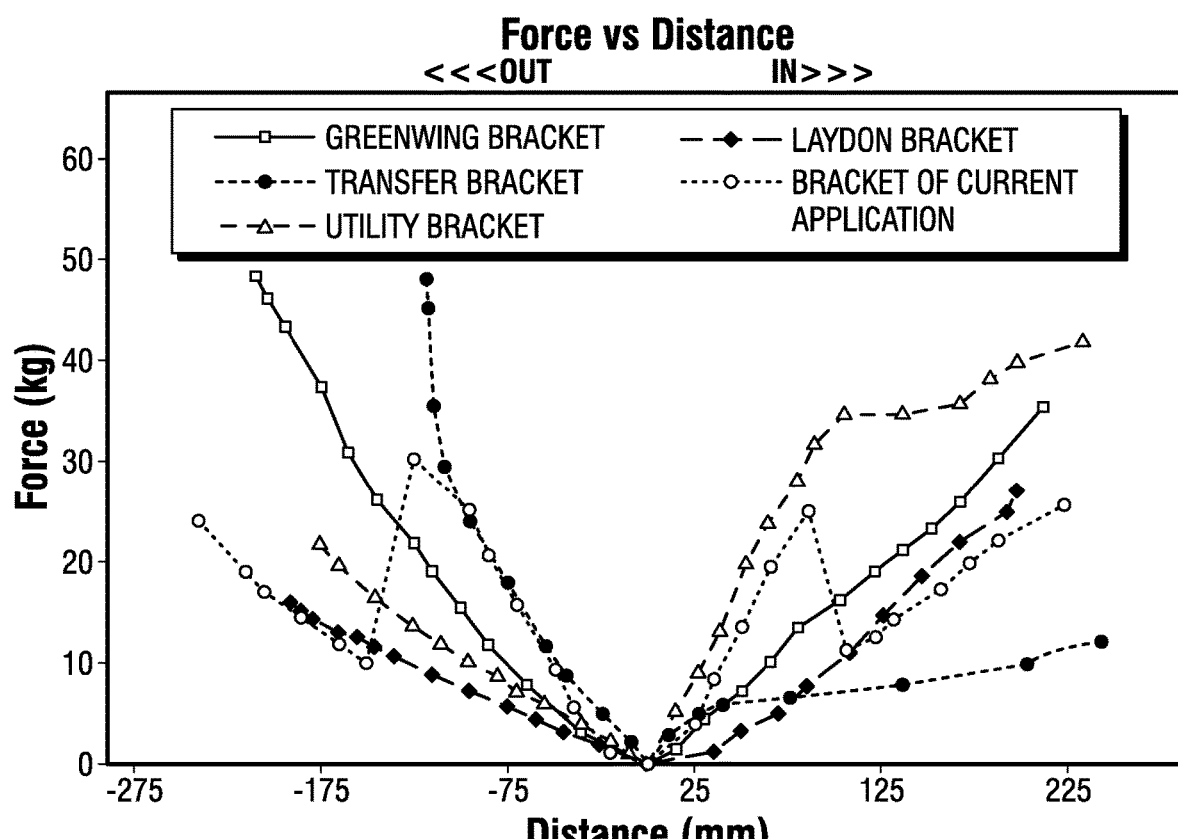
FIG. 7 is a graph showing the test results of the bracket of the current application as compared to prior art brackets.

FIG. 7 is a graph depicting test results of the present invention as compared to skirt supporting members of the prior art. The skirt-supporting member of the present invention was tested against Ridge Corp.'s Green Wing® side skirt, Laydon Composites, Ltd.'s Trailerskirt®, Utility Trailer Manufacturing Co.'s 120A-4 side skirt, and Transtex Composite's EDGE trailer skirt. As can be seen in the graph, the side skirt and skirt supporting member of the present invention is the only combination that buckles in response to a lateral force component reaching a threshold force. The precise moments at which the side skirt and skirt supporting member of the present invention buckles can be seen in the sharp decline in force when viewing the line corresponding to the present invention. In this way, the stiffness of the skirt supporting member before buckling is 8 to 10 times the stiffness of the skirt, and the stiffness of the skirt supporting member after buckling is 4 to 5 times the stiffness of the skirt, or stated more generally, reduces by 50% after buckling. Due to the bi-modulus bending member of the skirt supporting member of the present invention, the flexibility of the skirt is maximized in both an inward and outward direction. When compared to the skirts and skirt supporting members of the prior art, the performance of the present invention permitted continued use while the others experienced plastic deformation resulting in permanent damage preventing reuse of the trailer skirt mounting brackets. While the glass content of the Green Wing® skirt and supporting member allowed increased flexibility, the lack of a buckled and unbuckled configuration resulted in constantly increased resistance forces at various points of deflection in both inwards and outwards directions. Laydon's Trailerskirt® twisted, buckled, and failed in expected locations due to its plastic composition, which resulted in cracking and creasing under increased resistance forces. Further, Utility's 120A-4 side skirt was easily deformed and damages as a result of its steel construction and inability to buckle. Last, Transtex's EDGE trailer skirt could only be bent in an inwards direction, and it was also easily damaged due to its carbon fiber composition. Thus, the skirt supporting member of the present invention was superior due to its ability to buckle and thereby decrease the resistance force while deforming in either an inwards or outwards direction, which is not presently known within the art.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A method of mounting a trailer skirt to a trailer, comprising:
    attaching a trailer skirt to a trailer, the trailer skirt configured to pivot in a longitudinal direction of the trailer skirt,
    attaching a skirt-supporting member to the trailer in a cantilevered configuration, where in the cantilevered configuration the skirt-supporting member is configured to pivot in a longitudinal direction of the trailer skirt, and,
    operably coupling the trailer skirt to the skirt-supporting member,
    where the step of attaching the skirt-supporting member to the trailer in a cantilevered configuration is achieved by attaching a trailer mounting bracket to the trailer, the skirt-supporting member being pivotally attached to the trailer mounting bracket,
    where a pin is arranged to extend through both the skirt-supporting member and the trailer mounting bracket to provide a pivotable attachment.

2. The method of claim 1, where the step of attaching the skirt-supporting member to the trailer mounting bracket is achieved by arranging the skirt-supporting member within an orifice within the trailer mounting bracket.

3. The method of claim 1, where the step of attaching the skirt-supporting member to the trailer mounting bracket is achieved by arranging the skirt-supporting member within a resilient member formed of elastomeric material, where the skirt-supporting member extends into the resilient member and a pin is arranged to extend through both the resilient member and the skirt-supporting member.

4. The method of claim 3, where the elastomeric material is formed of polyurethane, rubber, or silicone.

5. The method of claim 1, where the step of operably coupling the trailer skirt to the skirt-supporting member provides a sliding coupling between the trailer skirt and the skirt-supporting member.

6. The method of claim 1, where the skirt-supporting member is an elongate bending member configured to elastically bend with application of a lateral force component.

7. The method of claim 6, where the elongate bending member is a bi-modulus bending member including one or more elongate bending elements each having a cross-section extending in both a direction of a width and a height of the elongate bending element, where each of the bi-modulus bending member and each of the one or more elongate bending elements are configured to elastically buckle and bend to a buckled configuration when the lateral force component exceeds a threshold force and elastically return to an unbuckled configuration when the lateral force component is reduced below the threshold force.

8. The method of claim 1, further comprising a step of operably fixing a portion of the trailer skirt to the trailer.

9. A trailer-skirt coupling apparatus comprising:
a trailer mounting bracket configured for mechanically coupling the apparatus to a trailer; and
a skirt-supporting member operably attached to the trailer mounting bracket in a cantilevered configuration, where in the cantilevered configuration, the skirt-supporting member is configured to pivot in a longitudinal direction of the trailer skirt, where the skirt-supporting member is pivotably coupled to the trailer mounting bracket with a pin extending through both the skirt-supporting member and the trailer mounting bracket to provide a pivotable attachment.

10. The trailer-skirt coupling apparatus of claim 9, where the skirt-supporting member is arranged within an orifice of the trailer mounting bracket.

11. The trailer-skirt coupling apparatus of claim 9, where the skirt-supporting member is arranged within a resilient member formed of elastomeric material, where the skirt-supporting member extends into the resilient member and the pin is arranged to extend through both the resilient member and the skirt-supporting member.

12. The trailer-skirt coupling apparatus of claim 11, where the elastomeric material is formed of polyurethane, rubber, or silicone.

13. The trailer-skirt coupling apparatus of claim 9, where the skirt-supporting member is configured to slide relative to the trailer skirt.

14. The trailer-skirt coupling apparatus of claim 9, where the skirt-supporting member is an elongate bending member configured to elastically bend with application of a lateral force component.

15. The trailer-skirt coupling apparatus of claim 14, where the elongate bending member is a bi-modulus bending member including one or more elongate bending elements each having a cross-section extending in both a direction of a width and a height of the elongate bending element, where each of the bi-modulus bending member and each of the one or more elongate bending elements are configured to elastically buckle and bend to a buckled configuration when the lateral force component exceeds a threshold force and elastically return to an unbuckled configuration when the lateral force component is reduced below the threshold force.

16. The trailer-skirt coupling apparatus of claim 9, where each elongate bending element has a non-linear cross-section, taken along a plane perpendicular to a lengthwise direction of the elongate bending element, where the cross-section forms a U-shaped or V-shaped cross-section having a flattened central peak.

17. The method of claim 1, where the pin forms an axis of rotation extending in a lateral direction of the trailer skirt, the lateral direction being perpendicular to the longitudinal direction of the trailer skirt and where the longitudinal direction of the trailer skirt extends generally in a longitudinal direction of the trailer.

18. The trailer-skirt coupling apparatus of claim 9, where the pin forms an axis of rotation extending in a lateral direction of the trailer skirt, the lateral direction being perpendicular to the longitudinal direction of the trailer skirt.

* * * * *